Jan. 5, 1965     S. EGE     3,164,670

ELECTRICAL CONDUCTOR

Filed July 31, 1961

INVENTOR.
SIGMUND EGE

BY *Victor F. Volk*

HIS AGENT

United States Patent Office 3,164,670
Patented Jan. 5, 1965

3,164,670
ELECTRICAL CONDUCTOR
Sigmund Ege, Hastings on Hudson, N.Y., assignor, by mesne assignments, to Anaconda Wire and Cable Company, a corporation of Delaware
Filed July 31, 1961, Ser. No. 128,144
2 Claims. (Cl. 174—128)

My invention relates to electrical conductors and particularly to conductors of large cross section for insulated cables.

In the manufacture of electric cables for high voltage service the cost of insulation and sheathing constitutes a major proportion of the overall cost of the cable. It is obviously desirable to keep this cost at a minimum and one of the ways this can be accomplished is by minimizing the size of the conductor for any given current carrying capacity. High voltage cables are often enclosed in oil-filled pipes or installed in other locations where space is at a premium and this, of course, makes it even more desirable to reduce the diameter of the cable conductors. The conductors of cables always require a certain amount of flexibility in order that the cables can be wound on reels for delivery from the factory and turned around corners at the installation site. For this reason any conductors above a certain minimum size are formed from a plurality of individual wires stranded together rather than from a single solid bar. The plurality of wires have a greater cross section than a solid bar would have because of the interstices between the wires and it has been known to reduce this cross section by crushing the conductors between rolls so that the individual wires are deformed from their original circular shape. This crushing operation is known as compacting, conductors so treated are known as compact conductors and the adjective "compact" as used in this application refers to conductors or cores that have been crushed. From a practical point of view, however, there has been a limit to the size of conductors that can be satisfactorily compacted. It will be understood that the deformation of the individual wires can be accomplished only at very high pressure and that the compacting operation becomes increasingly difficult as the cross section of the conductor to be compacted is increased. This is particularly true for conductors of circular cross section with the result that compacting of large conductors has been permissible only where a certain degree of distortion from the true shape of the conductor has been tolerable. In the case of very high voltage cables no deviation from the correct shape can be tolerated so that the compacting of large conductors of very high voltage cables has presented a particularly acute problem. There has been a further problem in compacting large cores made up of a plurality of layers of wire of different or reversed lay in that the compacting operation tends to pinch the wires at points of cross-over.

When electrical conductors are laid in close proximity to each other the electrical field is distorted, with the result that an alternating current will not be distributed uniformly within the conductor section, and the maximum current-carrying-capacity of the cable will not be realized. This is particularly true for pipe-type cables wherein the conductors are not only forced into close proximity but the field distortions are intensified by the electromagnetic properties of the pipe.

It has long been known that the electrical conductivity of a conductor can be increased for A.-C. service by isolating the elements of the conductor from each other so that the current will be forced to flow through the entire conductor cross section and not concentrated in certain portions of it. For this reason it has been suggested that an insulated coating, such as a wire enamel, might be applied to each of the conductor wires. This suggestion has not been widely adopted however for the reason that it is necessary to remove the enamel at terminations. In the case of large high-voltage power lines, connections are usually made at the site and time is at a premium so that the scraping of enamel from a conductor which may comprise as many as 91 strands has not been practical. This problem is, of course, even more difficult of solution when the wires are compacted. It is also questionable that the enamel would retain its insulating qualities after being compressed by the compacting rolls. As will hereinafter be described my invention provides a convenient and effective means for reducing proximity effects by isolating the conductor elements while at the same time providing a conductor that is easy to terminate.

I have invented a conductor having the required degree of flexibility and still maintaining a minimum diameter and cross section without sacrificing dimensional accuracy. My conductor comprises a plurality of wires compacted to form an inner compact core and a plurality of keystone-shaped wires helically surrounding said core. The core of my conductor is a compact core and preferably of the type known as compact round and keystone-shaped wires are formed in annular, helical layers around the said core. The layer of keystone-shaped wires may surround the core directly and be in electrical contact with it but I also have found it advantageous to coat each of the keystone wires with a coat of insulating enamel. I prefer that there should be at least one insulating barrier between an adjacent pair of the keystone-shaped wires. The coating enamel may be semiconducting. The keystone-shaped wires each comprise an inwardly facing surface, an outwardly facing surface and two side walls. In a preferred embodiment of my invention the inwardly facing surfaces and side walls are coated with insulating enamel while the outwardly facing surfaces are free from said enamel. Instead of enamel the inner surfaces and side walls may be covered with insulating tapes, such as polyester film tapes.

A more complete understanding of my invention can be obtained from a study of the appended drawing.

Figure 1:
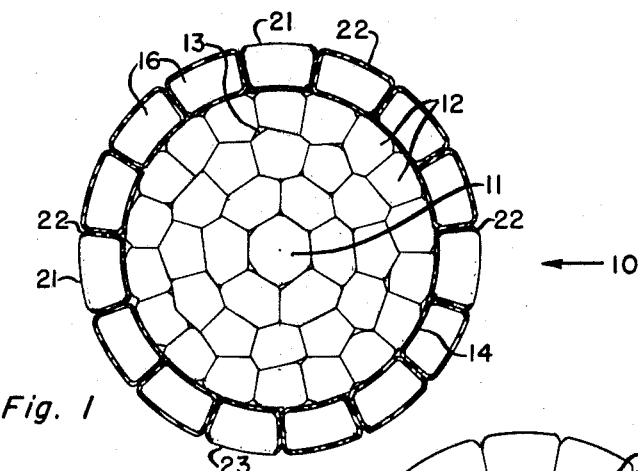
FIG. 1 is a section of a conductor made in accordance with my invention.
Figure 2:
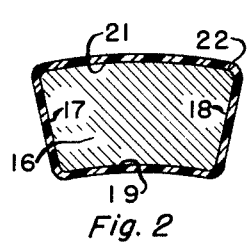
FIG. 2 is a section of one of the elements of my invention.
Figure 4:
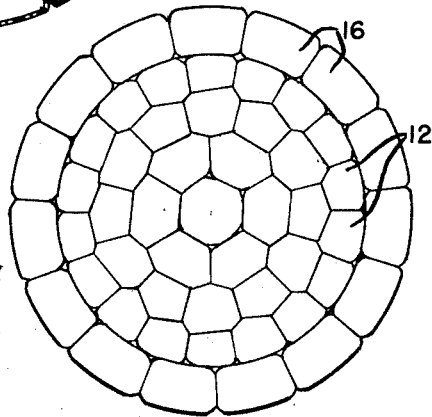
FIG. 4 is a section of a conductor made to still another embodiment of my invention.

Referring to the figures the conductor designated generally as 10 has a compact core 11 made up of a plurality of individual wires 12. The wires 12 were originally each circular in section but have been crushed out of shape so that interstices 13 have become substantially filled with conducting material. The material of the wires 12 will preferably be copper since this has the highest conductivity of any commercially practical metal but it will be understood that my method may also be applicable to conductors of aluminum, bronze and other metals. The core 11 of my conductor has an outer periphery 14 that is substantially round. This is possible because the diameter of the core 11 is not required to exceed the capacity of known types of compacting rolls. In order, however, to increase the diameter of my conductor to a size sufficient to carry appreciably more current I have surrounded the core 11 with a plurality of keystone-shaped conductors 16. Each of the conductors 16 is drawn to have the wedge-shaped dimensions shown in FIG. 2 with non-parallel sides 17 and 18 a concave base 19 and convex crown 21. The plurality of keystone-shaped wires 16 form a complete circle around the core 11 increasing the diameter of the conductor to the size required. From a consideration of FIGS. 1, 3 and 4 it will be apparent that there is very little waste space between the keystone-shaped wires and that my conductor maximizes the conductivity within any given cross-sectional area. An example of copper conductor made in accordance with my invention is a 720 mc.m. compact round 37-wire core surrounded by 15 keystone-shaped wires having a cross section of 530 mc.m. bringing the cross-sectional area of the whole conductor to 1250 mc.m. The O.D. of this conductor is 1.160 in. The compacting of the above core was accomplished without difficulty and it should be noted that a conductor made entirely of compacted strand and with the same area of 1250 mc.m. would have 91 wires and an O.D. of 1.185 in. Such a compacted conductor would, however, vary from a true circular section because of the difficulty, already mentioned, of compacting very large sections by any known method. A concentric uncompacted conductor of 1250 mc.m has an O.D. of 1.270 in. Thus my invention not only makes it possible to use the compacting technique for conductors of large size but also reduces the diameter under that of conductors compacted by known methods.

When it is so desired each of the keystone wires 16 can be coated with an insulating material to form a coating 22. The coating 22 may be one of a large number of known types of insulating enamel such as polyvinyl acetal, oleoresin, epoxy, nylon, etc. and may have a thickness of the order of one mil or less. The film thickness of the coating 22 may be very low because the potential drop across the film will never exceed a few volts. At the same time the coating 22 serves effectively to isolate each of the keystone wires from its neighbor and from the core 11 and effectively to reduce the proximity effect.

Figure 3:
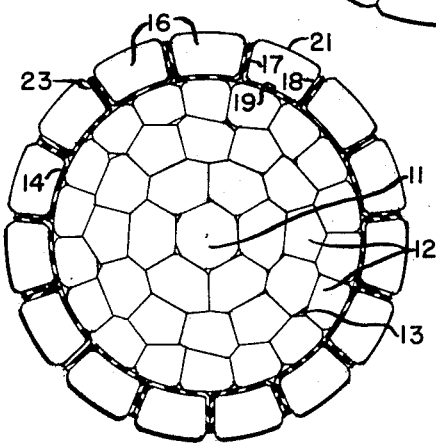
FIG. 3 is a section of a conductor made to another embodiment of my invention.

In the manufacture of an electric cable a semiconducting layer known as strand shielding is usually applied over the conductor. In order to allow electrical contact between the conductor and the strand shielding the coating 22 may be rendered semiconducting by the inclusion, say, of carbon particles. Where such semiconducting coatings are used they should have a volume resistivity from several hundred to about 50,000 ohm-cm. As alternative structures for isolating the keystone-shaped wires from the core and from each other while retaining electrical contact with the strand shielding, the inwardly facing surface 19 and sides 17, 18 of the wires 16 may be coated with insulating enamel while all or a part of the outwardly facing surface 21 is bare. It is not necessary that every one of the wires 16 should be electrically exposed on its surface 21, sufficient contact being obtained if a plurality, such as four, wires are exposed. In FIG. 3 the wires 16 are covered on their inwardly facing surfaces 19 and on their sides 17, 18 with dielectric tapes 23. The tapes 23 should be extremely tough and thin and are advantageously formed of a polyester film such as Mylar which is available in thicknesses less than one mil, or of polycarbonate which also has the necessary toughness and strength.

To manufacture the conductor of my invention a core 11 is first formed of a plurality, such as 37, of wires of circular cross section. When a copper conductor is being formed the wires are preferably deep-annealed in order to have a very soft core for compacting. The core leaving the strander is continuously passed through compacting rolls and reduced in diameter, care being taken to avoid any distortion from a true circular shape. The keystone-shaped wires are laid helically around the compact core. These keystone-shaped wires may previously have been coated with an insulating enamel. A final smoothing and forming of the conductor is then accomplished by passing it through a close-fitting nylon forming die.

I prefer to form the conductor of my invention according to the above method in a single, continuous operation but it will be understood that it is also possible to take up the compacted cores on reels and apply the keystone-shaped wires subsequently in a separate operation. Where tape insulation is applied under the keystone-shaped wires in accordance with FIG. 3, the tapes are conveniently fed into the stranding machine along with the wires in the above operation.

I claim:
1. An electrical conductor comprising:
  (A) a compact core of circular cross-section comprising a plurality of layers of compacted wires, and
  (B) a plurality of keystone-shaped wires forming a helical layer directly surrounding said core,
    (a) each of said keystone-shaped wires having the same cross-sectional shape throughout its length, and
    (b) said keystone-shaped wires being in continuous electrical contact with said core substantially throughout the length of said conductor.
2. An electrical conductor comprising:
  (A) a compact core of circular cross-section comprising a plurality of layers of compacted wires, and
  (B) a plurality of keystone-shaped wires forming a helical layer directly surrounding said core,
    (a) each of said keystone-shaped wires having the same cross-sectional shape throughout its length,
    (b) said keystone-shaped wires being in continuous electrical contact with said core substantially throughout the length of said conductor, and
    (c) said keystone-shaped wires being substantially larger in individual cross-section than said compacted wires.

References Cited by the Examiner

UNITED STATES PATENTS

| | | | |
|---|---|---|---|
| 1,943,087 | 1/34 | Poter et al. | 174—128 X |
| 2,066,525 | 1/37 | Gilbert | 174—114 |
| 2,122,911 | 7/38 | Hunter et al. | 57—161 |
| 2,156,652 | 5/39 | Harris | 57—161 X |
| 2,972,658 | 2/61 | Lapsley | 174—32 X |
| 3,014,139 | 12/61 | Shildneck | 174—114 X |

FOREIGN PATENTS 708,162    4/31    France.

JOHN F. BURNS, *Primary Examiner.*

JOHN P. WILDMAN, E. JAMES SAX, *Examiners.*